(12) United States Patent
Yamada

(10) Patent No.: US 9,325,260 B2
(45) Date of Patent: Apr. 26, 2016

(54) MOTOR CONTROL APPARATUS

(71) Applicant: DENSO CORPORATION, Kariya, Aichi-pref. (JP)

(72) Inventor: Jun Yamada, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/054,936

(22) Filed: Oct. 16, 2013

(65) Prior Publication Data

US 2014/0139172 A1  May 22, 2014

(30) Foreign Application Priority Data

Nov. 16, 2012 (JP) ................................ 2012-251852

(51) Int. Cl.
H02P 25/08 (2006.01)
H02P 6/08 (2006.01)
H02P 6/16 (2006.01)
F16H 61/32 (2006.01)

(52) U.S. Cl.
CPC .. H02P 6/08 (2013.01); H02P 6/16 (2013.01); F16H 2061/326 (2013.01)

(58) Field of Classification Search
CPC ....................................................... H02P 25/08
USPC ......................................................... 318/701
See application file for complete search history.

(56) References Cited

U.S. PATENT DOCUMENTS

| 2004/0008002 A1* | 1/2004 | Kamio | G05B 19/4062 318/701 |
|---|---|---|---|
| 2006/0138880 A1 | 6/2006 | Kimura et al. | |
| 2006/0207373 A1 | 9/2006 | Amamiya et al. | |
| 2009/0039822 A1 | 2/2009 | Kimura et al. | |
| 2009/0108791 A1 | 4/2009 | Isobe et al. | |
| 2010/0156333 A1* | 6/2010 | Chen et al. | 318/400.33 |

FOREIGN PATENT DOCUMENTS

| JP | 9-238234 | 9/1997 |
|---|---|---|
| JP | 2006-091145 | 4/2006 |
| JP | 2010-200432 | 9/2010 |
| JP | 2011-247391 | 12/2011 |

OTHER PUBLICATIONS

Japanese Office Action (3 pages) dated Aug. 27, 2015 issued in corresponding Japanese Application No. 2012-251852 with English-translation (3 pages).
Japanese Office Action (3 pgs.) dated Oct. 21, 2014 issued in corresponding Japanese Application No. 2012-251852 with an at least partial English-language translation thereof (4 pgs.).
Japanese Office Action (2 pages) dated Mar. 24, 2015 issued in corresponding Japanese Application No. 2012-251852 with English-translation (3 pages).

* cited by examiner

*Primary Examiner* — Eduardo Colon Santana
*Assistant Examiner* — Cortez Cook
(74) *Attorney, Agent, or Firm* — Nixon & Vanderhye PC

(57) ABSTRACT

In a butting control, while performing a constant current control for a motor based on an output of a current sensor, the motor is driven by sequentially switching over a current supply phase of the motor in a one-phase current supply method, in which only one of the phases of the motor is powered. By performing the constant current control in the butting control, changes in a current value of each phase caused by temperature changes or aging changes is suppressed and hence a torque change of the motor is suppressed. In addition, by sequentially switching over the current supply phase of the motor in the one phase current supply method under the constant current control, a torque change of the motor can be suppressed while maintaining the current value of the current supply phase at a constant value.

8 Claims, 6 Drawing Sheets

ONE-PHASE CURRENT SUPPLY

SEQUENCE OF CURRENT SUPPLY IN BUTTING CONTROL
(○: CURRENT SUPPLY PHASE)

| | 0 | 1 | 2 | 3 | 4 | 5 | 6 | 7 | 8 | 9 | 10 | 11 |
|---|---|---|---|---|---|---|---|---|---|---|---|---|
| U-PHASE | | | ○ | ○ | ○ | ○ | | | | | | |
| V-PHASE | | | | | | | ○ | ○ | ○ | ○ | | |
| W-PHASE | ○ | ○ | | | | | | | | | ○ | ○ |

ONE CYCLE

SECOND EMBODIMENT

TWO-PHASE CURRENT SUPPLY

SEQUENCE OF CURRENT SUPPLY IN BUTTING CONTROL
(○: CURRENT SUPPLY PHASE)
←

|  | 0 | 1 | 2 | 3 | 4 | 5 | 6 | 7 | 8 | 9 | 10 | 11 |
|---|---|---|---|---|---|---|---|---|---|---|---|---|
| U-PHASE | ○ | ○ | ○ | ○ | ○ | ○ | ○ | ○ |  |  |  |  |
| V-PHASE |  |  |  |  | ○ | ○ | ○ | ○ | ○ | ○ | ○ | ○ |
| W-PHASE | ○ | ○ | ○ | ○ |  |  |  |  | ○ | ○ | ○ | ○ |

ONE CYCLE

MOTOR CONTROL APPARATUS

CROSS REFERENCE TO RELATED APPLICATION

This application is based on and incorporates herein by reference Japanese patent application No. 2012-251852 filed on Nov. 16, 2012.

FIELD

The present disclosure relates to a motor control apparatus, which learns a reference position by performing a butting control, in which a motor is driven to rotate until a control object butts against a limit position in a movable range of the control object.

BACKGROUND

It is a recent tendency in an automotive vehicle to change a mechanical drive system to an electric system driven by a motor for meeting demands for less space, improved manufacturing, improved controllability and the like. As one exemplary system, a shift range switchover mechanism for an automatic transmission system of a vehicle is driven by a motor. This system includes an encoder provided to output a pulse signal at every predetermined angular rotation in synchronism with the rotation of the motor. When a shift range is switched over, a shift range is switched over to a target range by rotating the motor to a target rotation position (target count value) corresponding to the target shift range based on a count value of the pulse signal of the encoder.

According to such a system, as disclosed in JP-A-2004-308752 for example, a butting control is performed. In the butting control, a motor (actuator) is rotated until a shift range switchover mechanism butts a limit position in a movable range (P-wall position or non-P-wall position) to learn the limit position as a reference position. A rotation amount (rotation angle) of the motor is controlled based on the learned reference position as a reference.

In a system, in which a current flowing in each phase of a motor is duty-controlled based on a duty ratio corresponding to a voltage in a butting control, a current value of each phase of the motor varies with coil resistance changes caused by temperature changes, aging changes or the like, even if the voltage is not changed. As a result, it is likely that a torque of the motor varies and precision of learning will be lowered.

One system, which is under study, includes a current sensor for detecting a sum of currents flowing in plural phases of a motor (for example, a current flowing to a junction point of phase coils) and performs a constant current control to control the sum of currents flowing in the phases of the motor to a constant value based on the output of the current sensor in performing the butting control so that a change in the current value of each phase due to temperature change and aging change is suppressed. According to a system, in which a current supply phase of a motor is switched over by a one-two phase current supply method (one-phase current supply and two-phase current supply are switched over alternately among phases of the motor) while performing the constant current control, the current value of the current supply phase changes at every switchover between the one-phase current supply operation and the two-phase current supply operation. This causes changes in the motor torque and hence lowers the precision in the reference position learning.

SUMMARY

It is therefore an object to provide a motor control apparatus, which is capable of controlling a torque of a motor at a generally constant value and improving precision of learning a reference position in performing a butting control.

According to one aspect, a motor control apparatus comprises a motor, a current sensor and a control unit including a reference position learning section. The motor has plural phases and drives a control object. The current sensor detects a current flowing to the motor. The reference position learning section learns a reference position by performing a butting control, which rotates the motor until the control object butts a limit position in a movable range of the control object. The reference position learning section drives the motor for rotation in the butting control by sequentially switching over a current supply phase of the motor in a current supply method. The number of the current supply phase of the motor is fixed. The reference position learning section performs a constant current control for controlling a sum of currents flowing in respective phases of the motor to a constant value based on an output of the current sensor in the butting control.

EMBODIMENT

A motor control apparatus will be described below with reference to plural embodiments, in which the motor control apparatus is implemented in a shift range switchover apparatus for an automatic transmission system.

First Embodiment

Figure 1:
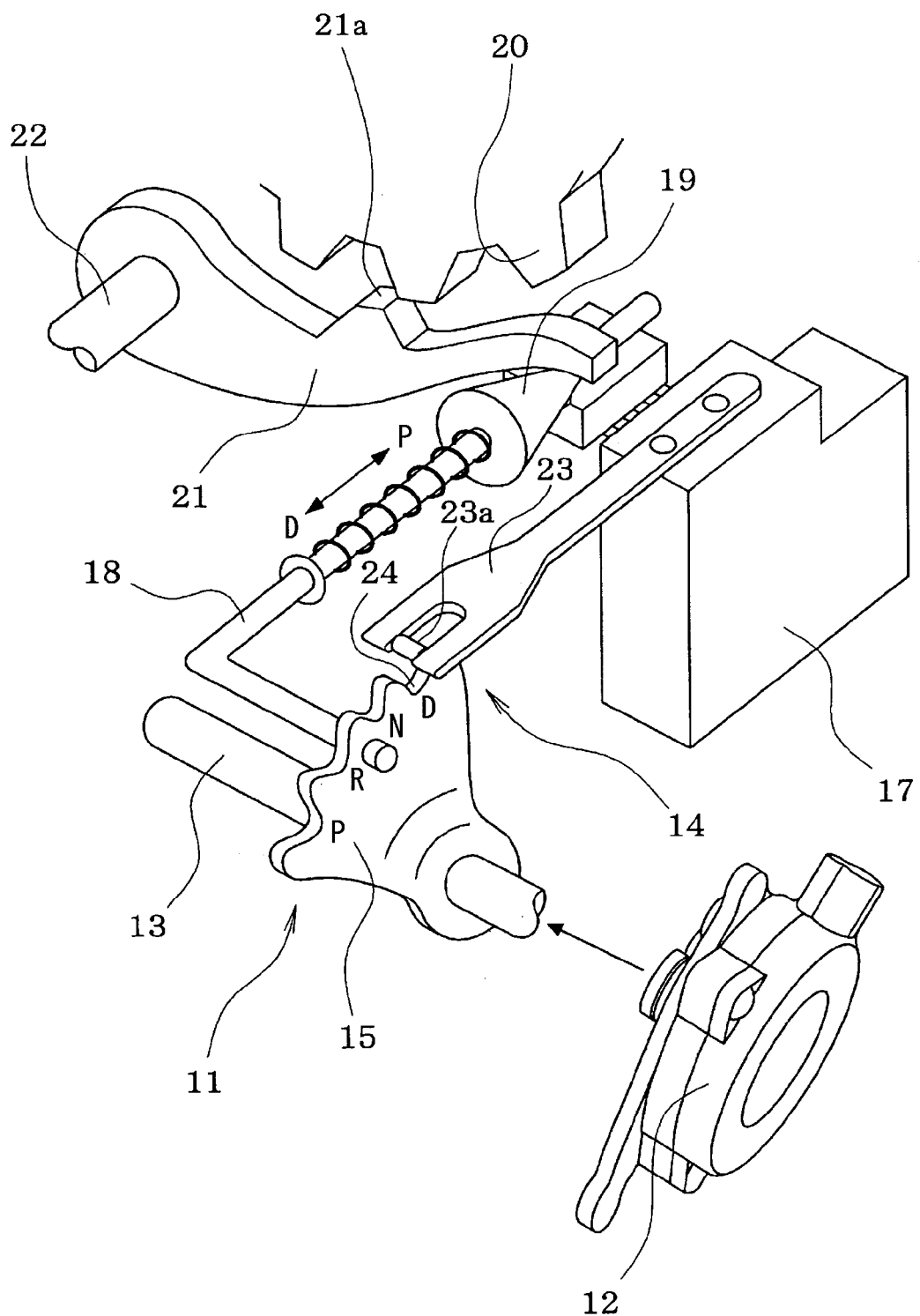
FIG. 1 is a schematic view of a shift range switchover apparatus according to a first embodiment.
Figure 2:
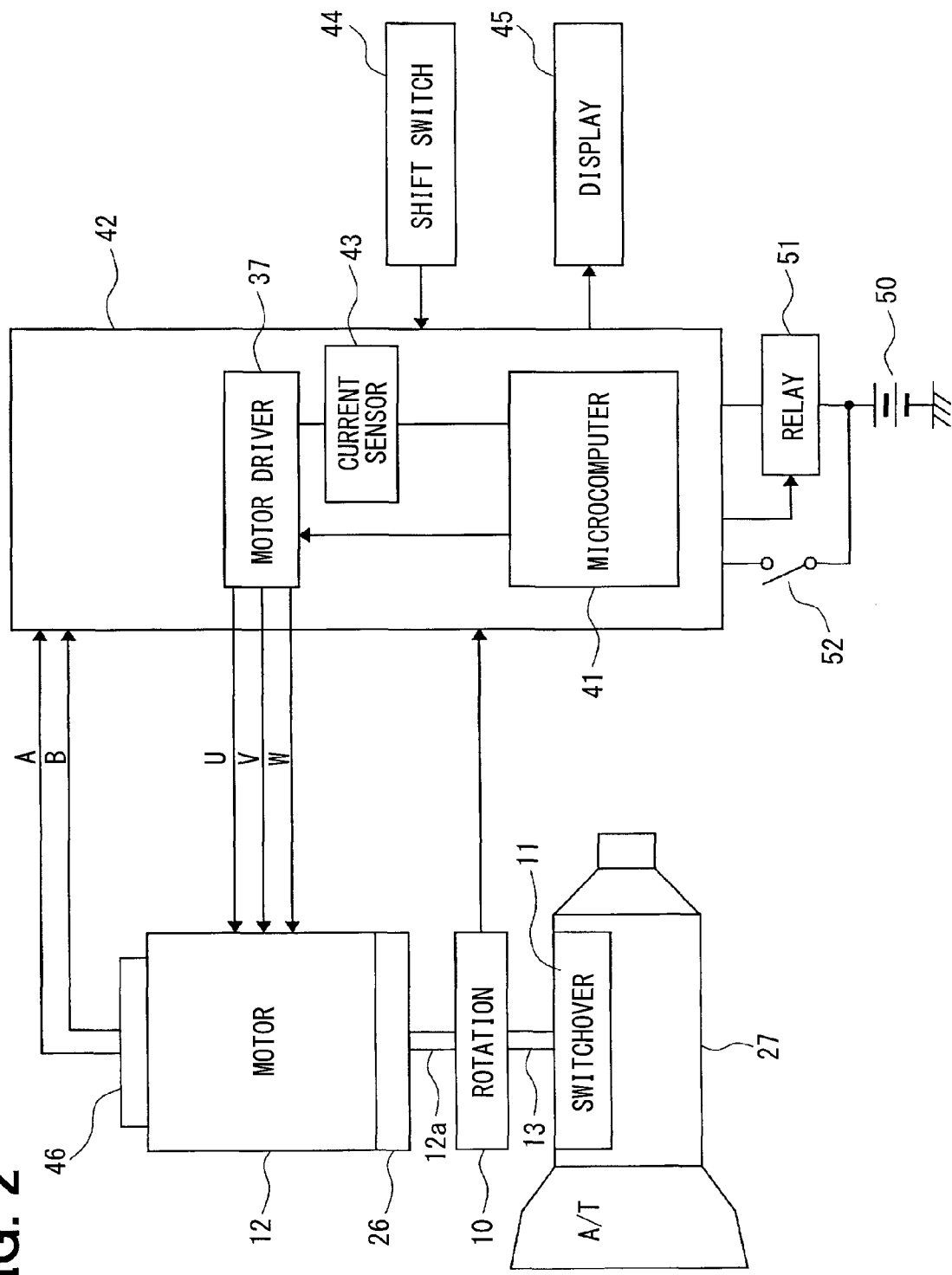
FIG. 2 is a block diagram of a control system for the range switchover apparatus shown in FIG. 1.

Referring to FIG. 1 and FIG. 2, a shift range switchover mechanism 11 is a four-position range switchover mechanism, which switches over a shift range of an automatic transmission system 27 among a P-range (parking range), an R-range (reverse range), an N-range (neutral range) and a D-range (drive range). The range switchover mechanism 11 uses as its drive power source a motor 12, which is for example a switched reluctance motor. Thus, the shift range switchover mechanism 11 is provided as a control object of the motor 12. The motor 12 has a reduction mechanism 26 therein and has an output shaft sensor 10, which detects a rotation position of its output shaft 12a. A manual shaft 13 is coupled to the output shaft 12a of the motor 12. A detent lever 15 is fan-shaped and fixed to the manual shaft 13.

A manual valve (not shown) is coupled to the detent lever 15 to move linearly in correspondence to rotation of the detent lever 15. The manual valve is provided to switch over a hydraulic pressure circuit (not shown) in the automatic transmission system 27 for switching over a shift range.

An L-shaped parking rod 18 is fixed to the detent lever 15. A conical body 19 provided at a top end of the parking rod 18 contacts a lock lever 21. The lock lever 21 moves up and down about an axis 22 in correspondence to a position of the conical body 19 to lock and unlock a parking gear 20. The parking gear 20 is provided about the output shaft of the automatic transmission system 27. When the parking gear 20 is locked by the lock lever 21, drive wheels of a vehicle are held in a rotation-stop state (parking state).

A detent spring 23 is fixed to a support base 17 for holding the detent lever 15 in each of shift ranges P, R, N and D. The detent lever 15 is formed with range holding recesses 24 in correspondence to the ranges P, R, N and D. When an engagement member 23a provided at the top end of the detent spring 23 falls to fit in any one of the range holding recesses 24, the detent lever 15 is held in the corresponding one of the shift ranges. The detent lever 15 and the detent spring 23 form a detent mechanism 14, which engages and holds a rotation position of the detent lever 15 in the corresponding one of positions of the shift ranges, that is, holds the shift range switchover mechanism 11 in corresponding one of positions of the shift ranges.

In the P-range, the parking rod 18 is moved in a direction to approach the lock lever 21 so that the large-diameter part of the conical body 19 lifts the lock lever 21 to fit a protrusion 21a of the lock lever 21 in the parking gear 20 and lock the ring gear 20. Thus the output shaft of the automatic transmission system 27 (drive wheels) is held in the locked state (parking state).

In the other ranges than the P-range, the parking rod 18 is moved in a direction leaving away from the lock lever 21, the large-diameter part of the conical body 19 is pulled out of the lock lever 21 to lower the lock lever 21 and disengage the protrusion 21a of the lock lever 21 from the parking gear 20. As a result, the output shaft of the automatic transmission system 27 is held in a rotatable state (travelable state).

The output shaft sensor 10 is formed as a rotation sensor (for example, a potentiometer), which outputs a voltage corresponding to a rotation angle of the output shaft 12a of the reduction mechanism 26 of the motor 12. It is thus possible to confirm whether the actual shift range is the P-range, the R-range, the N-range or the D-range based on the output voltage. Even when the output shaft sensor 10 is not provided, an encoder 46 described later can confirm whether the actual shift range is either one of the P-range, the R-range, the N-range and the D-range.

As shown in FIG. 2, the motor 12 is provided with the encoder 46, which detects a rotation angle (rotation position) of a rotor of the motor 12. The encoder 46 may be a magnetic rotary-type encoder. The encoder 46 is configured to output pulse signals of A-phase and B-phase to a shift range switchover control apparatus 42 (range switchover apparatus) in synchronism with rotation of a rotor of the motor 12 at every predetermined angular interval. The range switchover control apparatus 42 is provided with a microcomputer 41, which counts both rising edges and falling edges of the A-phase signal and the B-phase signal outputted from the encoder 46. Further the microcomputer 41 controls a motor driver 37, which drives the motor 12 to rotate by switching over the power supply phase of the motor 12 in a predetermined sequence based on a count value (encoder count value). It is possible to provide two systems, each including three phase (U, V, W) coils of the motor 12 and the motor drivers 37, so that, even when one system fails, the motor 12 is driven to rotate by the other system.

While the motor 12 is in rotation, the direction of rotation of the motor 12 is determined based on the order of generation of the A-phase signal and the B-phase signal. The encoder count value is counted up in a case of rotation in a normal direction (direction of rotation from P-range to D-range). The encoder count value is counted down in a case of rotation in a reverse direction (direction of rotation from D-range to P-range). Thus, even when the motor 12 is rotated in any one of the normal direction and the reverse direction, the relation of correspondence between the encoder count value and the rotation angle of the motor 12 is maintained. It is therefore possible to detect the rotation position of the motor 12 based on the encoder count value in any of the normal rotation and the reverse rotation and drive the motor 12 for rotation by supplying currents (electric power) to phase coils, which correspond to the detected rotation position.

The range switchover control apparatus 42 receives a signal indicating a shift lever operation position detected by a shift switch 44. The microcomputer 41 of the range switchover control apparatus 42, which is provided as a control unit, thus switches over a target range in response to the shift lever operation or the like of a driver, switches over the shift range by driving the motor 12 to rotate in correspondence to the target range, and displays the switched-over actual shift range on a display unit 45 provided in an instrument panel (not shown).

The range switchover control apparatus 42 is supplied with a power supply voltage from a battery 50 (power source) mounted on the vehicle through a power supply relay 51. The power supply relay 51 is turned on and off by manually turning on and off an IG switch 52 (ignition switch) provided as a power supply switch. When the IG switch 52 is turned on, the power supply relay 51 is turned on to apply the power supply voltage to the range switchover control apparatus 42. When the IG switch 52 is turned off, the power supply relay 51 is turned off to shut off power supply to the range switchover control apparatus 42. Further, the range switchover control apparatus 42 is provided with a current sensor 43, which detects a sum of currents flowing in plural phases of the motor 12 (for example, currents flowing to a junction or merger point at which phase coils are connected in common or currents supplied to the motor driver 37).

The encoder count value is stored in a RAM (not shown) of the microcomputer 41 and hence the stored encoder count value is lost when the power supply to the range switchover control apparatus 42 is turned off. For this reason, the encoder count value available immediately after the power supply to the range switchover control apparatus 42 does not correspond to the actual rotation position (current supply phase) of the motor 12. For switching over the current supply phase in accordance with the encoder count value, it is necessary to match the encoder count value and the current supply phase by matching the encoder count value and the actual rotation position of the motor 12 after the power supply is turned on.

The microcomputer 41 therefore learns the relation between the current supply phase of the motor 12 and the encoder count value by performing an initial driving after the current supply is turned on. In this initial driving, the current supply phase of the motor 12 is switched over one cycle in a predetermined time schedule in an open-loop control. Thus, the motor 12 is driven to rotate while matching the rotation position and the current supply phase of the motor 12 at either one of the current supply phases. The edges of the A-phase signal and the B-phase signal of the encoder 46 are counted. The relation of correspondence between the encoder count value and the rotation position of the motor 12 at the end of the initial driving is learned.

The microcomputer 41 can only detect the amount of rotation (rotation angle) of the motor 12 from the start position based on the encoder count value after the motor 12 is started. For this reason, the motor 12 cannot be driven to rotate to the target position accurately unless the absolute rotation position of the motor 12 is detected by some means after the power supply is turned on.

The microcomputer 41 therefore executes a reference position learning routine shown in FIG. 7 as described later. That is, after the initial driving is finished, the microcomputer 41 performs a butting control, by which the motor 12 is rotated until it butts a limit position in a movable range of the shift range switchover mechanism 11. The microcomputer 41 learns the limit position as a reference position and controls the rotation amount (rotation angle) of the motor 12 based on the encoder count value of the reference position as a reference.

In this case, for example, a "P-range wall butting control" is performed so that the motor 12 is rotated until the engagement part 23a of the detent spring 23 comes to contact or hit the P-range wall (side wall of a P-range holding concave part 24), which is the limit position on the P-range side of the movable range of the range switchover mechanism 11. Thus, the limit position of the P-range side is learned as the reference position. Alternatively it is possible to perform a "D-range wall butting control" so that the motor 12 is rotated until the engagement part 23a of the detent spring 23 comes to contact of hit the D-range wall (side wall of a D-range holding concave part 24), which is a limit position on the D-range side of the movable range of the range switchover mechanism 11, and learn the limit position of the D-range side as the reference position.

It is noted here that, in a system, in which the current flowing in each phase of the motor 12 is duty-controlled based on a duty ratio corresponding to a voltage in performing the butting control, the current value of each phase of the motor 12 varies and the torque of the motor 12 varies due to changes in coil resistances caused by temperature changes or aging changes even when the voltage is unchanged. As a result, the precision of learning the reference position is likely to be lowered.

Figures 3, 4:
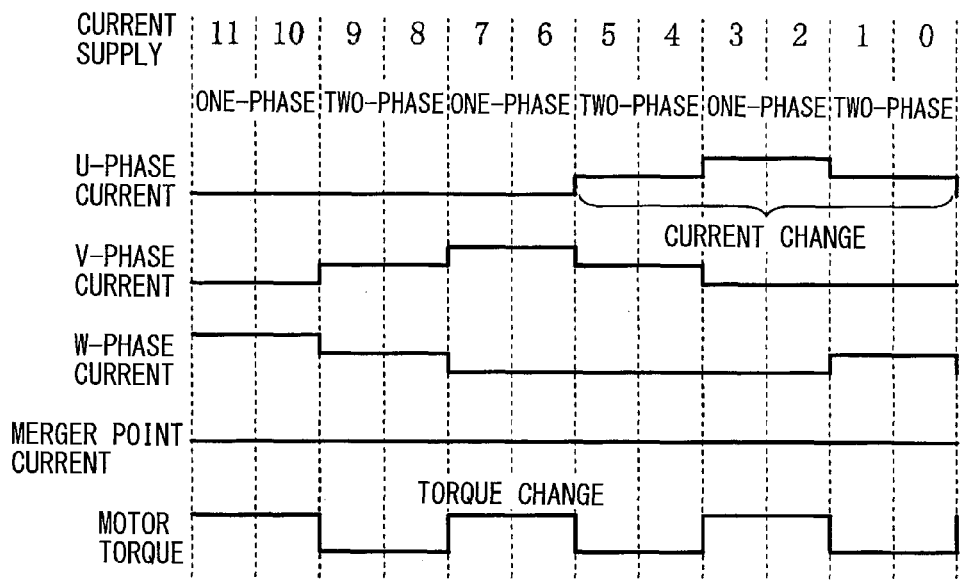
FIG. 3 is a time chart showing a current supply method of a motor according to a comparative example.
FIG. 4 is a diagram showing a current supply phase switchover pattern in a one-two phase current supply method.

Therefore, a constant current control is performed to feedback-control a merger current of the motor 12 (a sum of phase currents flowing in respective phases) at a constant value based on the output of the current sensor 43 in performing the butting control. In one exemplary system shown in FIG. 3 as a comparative example, current supply phases of a motor are switched over by a one-two phase current supply method (FIG. 4). In this method, a one-phase current supply mode and a two-phase current supply mode are switched over alternately among phases of the motor 12, while performing the constant current control for controlling the merger point current of the motor 12 to the constant value based on the output of the current sensor 43. Since the current value of the current supply phase changes at every switchover between the one-phase current supply mode and the two-phase current supply mode. This causes changes in the torque of the motor 12 and hence tends to lower the precision in the reference position learning.

Figures 5, 6:
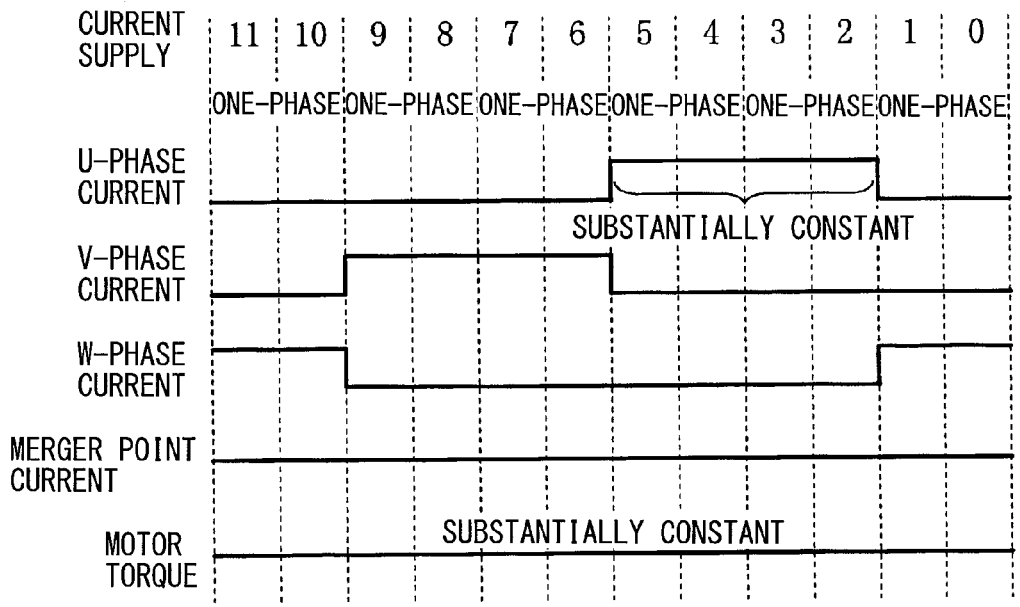
FIG. 5 is a time chart showing a current supply method of a motor according to the first embodiment.
FIG. 6 is a diagram showing a current supply phase switchover pattern according to a one-phase current supply method.

For this reason, according to the first embodiment, as shown in FIG. 5, the motor 12 is driven to rotate by sequentially switching over the current supply phase of the motor 12 by the one-phase current supply method (FIG. 6), in which only one of the phases of the motor 12 is powered by the current supply, while performing the constant current control for controlling the merger point current of the motor 12 at the constant value based on the output of the current sensor 43.

By performing the constant current control for controlling the merger point current of the motor 12 at the constant value in a feedback manner based on the output of the current sensor 43 in performing the butting control, changes in the current values of the phases caused by the temperature changes or the aging changes can be suppressed and hence the torque change of the motor 12 caused by the temperature changes or the aging changes can be suppressed. Further, by switching over the current supply phase sequentially by the one-phase current supply method while performing the constant current control, the current value of the current supply phase can be maintained at the constant value and the torque change in the motor 12 caused by the switchover of the current supply phase can be suppressed.

According to the first embodiment, the motor 12 is driven to rotate from its stop state in performing the butting control. For this reason, in starting the butting control, the motor 12 is maintained at the stop position by continuously supplying a current to a phase, which corresponds to the present rotational position of the motor 12, for a predetermined time interval by the one-two phase current supply method (FIG. 4).

Figure 7:
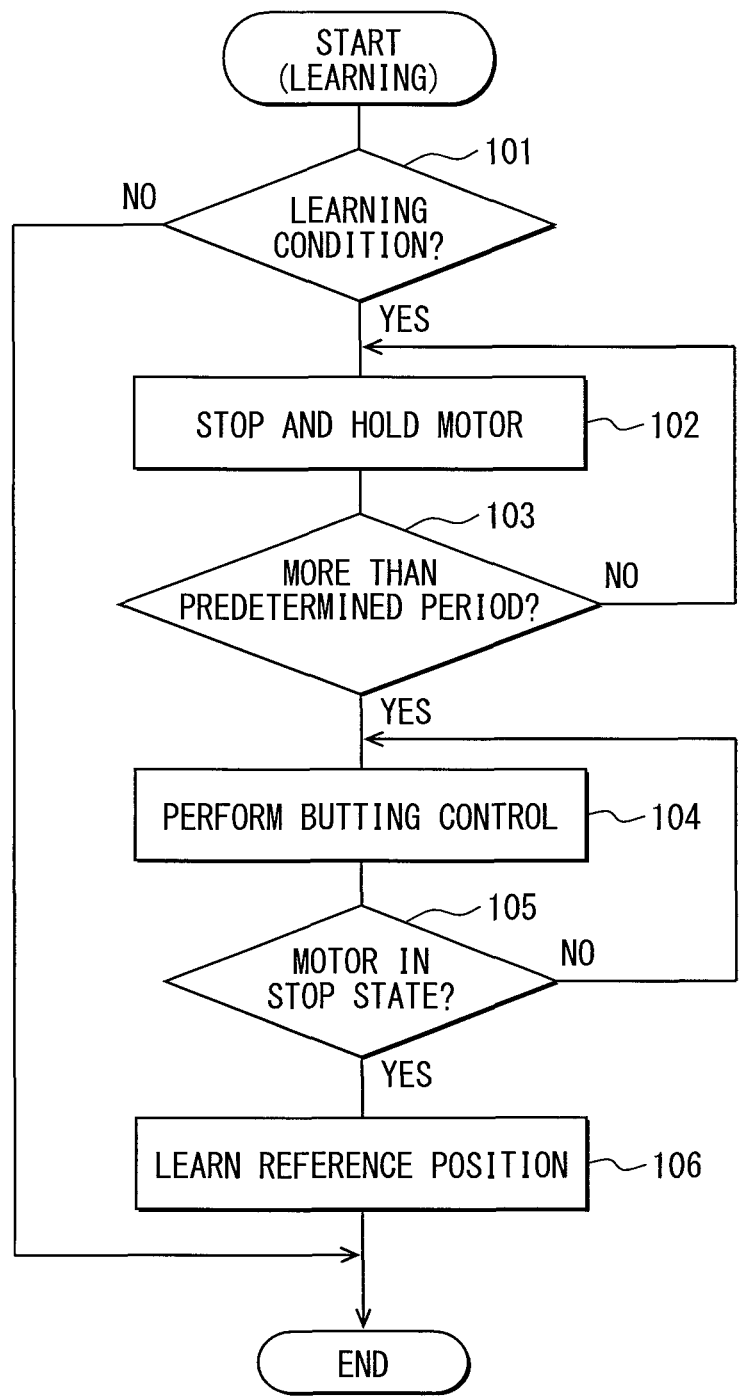
FIG. 7 is a flowchart showing a reference position learning routine performed in the first embodiment.

The reference position learning according to the first embodiment described above, is performed according to a reference position learning routine shown in FIG. 7 by the microcomputer 41 of the range switchover control apparatus 42. Processing of this routine will be described below.

The reference position learning routine shown in FIG. 7 is repetitively executed at a predetermined interval during a period the power is supplied to the range switchover control apparatus and operates as a reference position learning section. When this routine is started, it is checked first at step 101 whether a predetermined learning execution condition is satisfied, for example, whether the initial driving has been completed or whether the reference position learning has not yet been completed. If it is determined that the learning execution condition is not satisfied, this routine is terminated without executing step 102 and its subsequent steps.

If it is determined at step 101 that the learning execution condition is satisfied, step 102 is executed and the motor 12 is held in the stop state by supplying the current to the phase corresponding to the present rotation position of the motor 12 in the one-two phase power supply method.

Then step 103 is executed and it is checked whether a predetermined period has elapsed from the start of current supply (that is, the current supply is continued for the predetermined period is supplied). If it is determined that the predetermined period has not yet elapsed, step 102 is executed again and the motor 12 is continuously held in the stop state, If it is determined at step 103 that the predetermined period has elapsed from the start of current supply, step 104 is executed and the butting control (for example, P-range wall butting control or D-range wall butting control), in which the motor 12 is driven to rotate until the shift range switchover mechanism 11, particularly the detent lever 15, butts or contact the limit position in its the movable range. In this butting control, the motor 12 is driven to rotate by sequentially switching over the current supply phase in the one-phase current supply method while performing the constant current control, which controls the current at the merger point of the motor 12 at the constant value based on the output of the current sensor 43.

Then step 105 is executed and it is checked whether the motor 12 stopped rotating. If it is determined that the motor 12 is rotating, step 104 is repeated to continue the butting control.

If it is determined at step 105 that the motor 12 stopped rotating, it is determined that the motor 12 has butted the limit position in the movable range of the range switchover mechanism 11. Step 106 is executed and the encoder count value (encoder count value corresponding to the limit position) at that time is learned (stored) as the reference position.

In the first embodiment described above, the constant current control is performed to control the merger point current of the motor 12 at the constant value based on the output of the current sensor 43 in the butting control. It is therefore possible to suppress variation in the current of each phase due to temperature change or aging change and to suppress variation in the torque of the motor 12 due to temperature changes or aging changes. Further, the current supply phase of the motor 12 is sequentially switched over in one-phase current supply method while performing the constant current control. It is therefore possible to maintain the current value flowing in the current supply phase at the constant value and to suppress torque change of the motor 12 caused by the switchover of the current supply phases. As a result, the torque of the motor 12 can be controlled at generally the constant value when performing the butting control and the precision of learning the reference position can be improved.

Still further, in the first embodiment, in starting the butting control, the motor 12 is held in the stop state by supplying current for the predetermined period to the phase corresponding to the present rotation position of the motor 12 in the one-two phase current supply method. It is thus possible to drive the motor 12 to rotate from the state that the motor 12 is completely stopped in performing the butting control. In addition, the one-two phase current supply method is capable of defining a pitch of a rotation position for holding the stop state to be smaller in comparison to the one-phase current supply method or two-phase current supply method. It is thus possible to maintain the motor 12 in the stop state at a position near the immediately preceding rotation position of the motor 12 by supplying the current to the phase corresponding to the present rotation position of the motor 12 in the one-two phase current supply method for the predetermined period.

Second Embodiment

A motor control apparatus according to a second embodiment will be described next with reference to FIG. 8 and FIG. 9, in which only operations different from the first embodiment are shown.

Figures 8, 9:
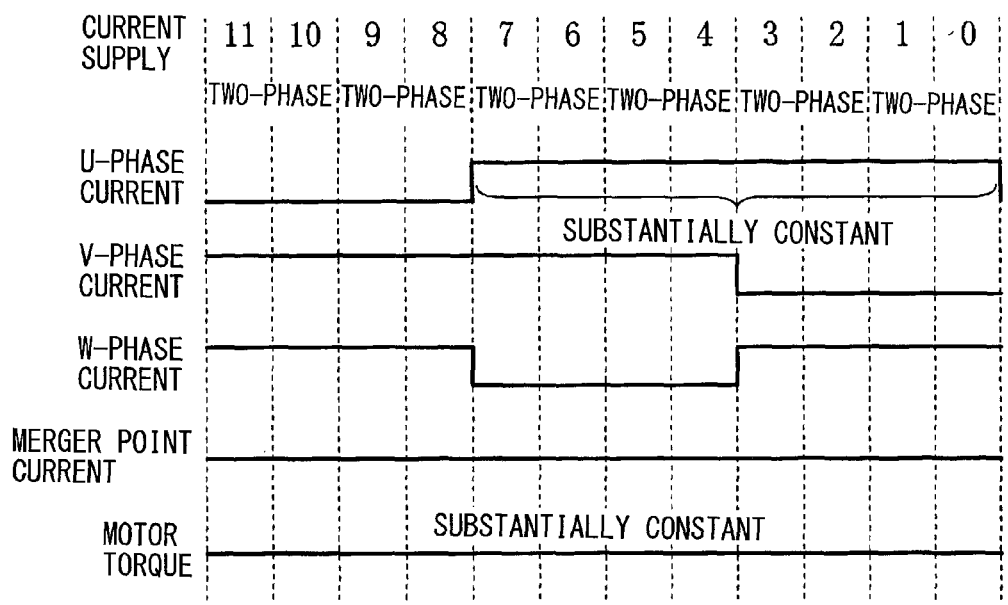
FIG. 8 is a time chart showing a current supply control method for a motor according to a second embodiment.
FIG. 9 is a diagram showing a current supply phase switchover pattern in a two-phase current supply method.

According to the second embodiment, as shown in FIG. 8, the motor 12 is driven to rotate by sequentially switching over the current supply phases of the motor 12 by only the two-phase current supply method (FIG. 9), in which two of the phases of the motor 12 are powered by the current supply. This operation is performed with the constant current control for controlling the merger point current of the motor 12 at the constant value based on the output of the current sensor 43. According to the second embodiment, substantially the same advantages will be provided as in the first embodiment.

In the first and the second embodiments described above, the motor 12 is driven to rotate by sequentially switching over the current supply phases of the motor 12 by the one-phase current supply method or the two-phase current supply method as the current supply method for maintaining the number of current supply phases of the motor 12 at a constant value (on or two) in performing the butting control. However, it is possible to drive the motor to rotate by sequentially switching over the current supply phases in a current supply method, in which three or more phases are supplied with current while maintaining the number of current supply phases of the motor in a system using a motor of four or more phases.

In the first and the second embodiments, a magnetic encoder is used as the encoder 46. However, an optical encoder or brush-type encoder may be used. Further, the encoder 46 is not limited to an encoder, which outputs two phase signals (A-phase signal and B-phase signal). The encoder may output a Z-phase signal for correction (for indexing) in addition to the A-phase signal and the B-phase signal.

In the first and the second embodiments, a switched reluctance motor (SR motor) is used as the motor 12. However, other types of brushless synchronous motor may be used as long as the brushless synchronous motor sequentially switches over the current supply phases of the motor by detecting the rotation position of the motor based on the count value of the output signal of the encoder.

In the first and the second embodiments, the motor drive apparatus is implemented exemplarily in the system having the shift range switchover mechanism, which switches over the shift ranges among four ranges that are the P-range, the R-range, the N-range and the D-range. However, it may be implemented in a shift range switchover mechanism, which switches over the shift ranges between two ranges of P-range and non-P-range. Alternatively, the motor control apparatus may be implemented in a system having a shift range switchover mechanism, which switches over the shift range among three ranges or five or more ranges.

Further, the motor control apparatus may be implemented in a shift range switchover mechanism, which switches over a shift range of a reduction mechanism of an electric vehicle.

In addition, the motor control apparatus may be implemented in other embodiments, such as various position switchover apparatus, which uses a brushless-type synchronous motor such as a SR motor as a drive power source.

What is claimed is:

1. A motor control apparatus comprising:
    a motor having plural phases for driving a control object;
    a current sensor for detecting a current flowing to the motor; and
    a control unit including a reference position learning section for learning a reference position by performing a butting control, which rotates the motor until the control object butts a limit position in a movable range of the control object, wherein:
    the reference position learning section drives the motor for rotation in the butting control by sequentially switching over a current supply phase of the motor in a current supply method, in which the number of the current supply phase of the motor, to which the current is supplied at same time, is fixed thereby to suppress torque change in the motor caused by switchover of the current supply phase so that the value of torque of the motor is controlled to a substantially constant value, while performing a constant current control for controlling a sum of currents flowing in respective phases of the motor to a constant value based on an output of the current sensor; and
    the control object is a shift range switchover mechanism, which switches over shift ranges of an automatic transmission system.

2. The motor control apparatus according to claim 1, wherein:
    the motor has three phases; and
    the number of the current supply phase, which is sequentially switched over in the butting control, is one or two.

3. The motor control apparatus according to claim 1, wherein:
   the motor has three phases; and
   the reference position learning section holds, before starting the butting control, the motor in a stop state by supplying the current to a phase corresponding to a present rotation position of the motor for a predetermined period in a one-two phase current supply method, the one-two phase current supply method switching over the current supply phase between a one-phase current supply for supplying the current to one phase of the three phases and a two-phase current supply for supplying the current to two phases of the three phases.

4. A motor control apparatus comprising:
   a motor having plural phases for driving a control object; and
   a control unit, including processor, configured to:
      detect a current flowing to the motor;
      learn a reference position by performing a butting control, which rotates the motor until the control object butts a limit position in a movable range of the control object; and
      drive the motor for rotation in the butting control by sequentially switching over a current supply phase of the motor, in which the number of the current supply phase of the motor, to which the current is supplied at same time, is fixed thereby to suppress torque change in the motor caused by switchover of the current supply phase so that the value of torque of the motor is controlled to a substantially constant value, while performing a constant current control for controlling a sum of currents flowing in respective phases of the motor to a constant value based on the detected current;
   wherein the control object is a shift range switchover mechanism, which switches over shift ranges of an automatic transmission system.

5. The motor control apparatus according to claim 4, wherein:
   the motor has three phases; and
   the number of the current supply phase, which is sequentially switched over in the butting control, is one or two.

6. The motor control apparatus according to claim 4, wherein:
   the motor has three phases; and
   the control unit is further configured to hold, before starting the butting control, the motor in a stop state by supplying the current to a phase corresponding to a present rotation position of the motor for a predetermined period in a one-two phase current supply method, the one-two phase current supply method switching over the current supply phase between a one-phase current supply for supplying the current to one phase of the three phases and a two-phase current supply for supplying the current to two phases of the three phases.

7. The motor control apparatus according to claim 1, wherein:
   the reference position learning section performs the constant current control so that the current supplied to each phase is inversely proportional to the number of the current supply phase and the current supplied to the current supply phase at the same time is equal, and
   the reference position learning section fixes the number of the current supply phase without switching over the current supply phase during a period of performing the constant current control.

8. The motor control apparatus according to claim 4, wherein the control unit is further configured to:
   perform the constant current control so that the current supplied to each phase is inversely proportional to the number of the current supply phase and the current supplied to the current supply phase at the same time is equal, and
   fix the number of the current supply phase without switching over the current supply phase during a period of performing the constant current control.

* * * * *